United States Patent
Sihlbom (10) Patent No.: US 9,351,266 B2
(45) Date of Patent: May 24, 2016

(54) METHOD AND APPARATUS FOR INITIAL RANGING FOR ESTABLISHING A TIME REFERENCE FOR A PREDEFINED SIGNATURE SIGNAL

(75) Inventor: Bjorn Ulf Anders Sihlbom, Vastra Frolunda (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 136 days.

(21) Appl. No.: 13/499,464

(22) PCT Filed: Oct. 2, 2009

(86) PCT No.: PCT/EP2009/062808
§ 371 (c)(1),
(2), (4) Date: Mar. 30, 2012

(87) PCT Pub. No.: WO2011/038774
PCT Pub. Date: Apr. 7, 2011

(65) Prior Publication Data
US 2012/0188995 A1 Jul. 26, 2012

(51) Int. Cl.
*H04W 56/00* (2009.01)
*H04B 1/00* (2006.01)
*H04B 7/26* (2006.01)

(52) U.S. Cl.
CPC .............. *H04W 56/00* (2013.01); *H04B 1/005* (2013.01); *H04B 7/2603* (2013.01)

(58) Field of Classification Search
CPC .............. H04W 56/00; H04L 27/2647; H04L 25/03044; H04L 2025/03426
USPC .................. 370/210, 226, 294–295, 319, 344
See application file for complete search history.

(56) References Cited

U.S. PATENT DOCUMENTS

| 4,825,416 A * | 4/1989 | Tam ...................... G11C 7/1039 365/189.02 |
| 7,586,976 B1 * | 9/2009 | Duggan .............. H04L 27/2647 370/453 |
| 8,149,961 B1 * | 4/2012 | Tewfik ................ H04L 27/2665 370/320 |
| 2002/0114301 A1 * | 8/2002 | Yee ....................... H04B 7/2603 370/338 |
| 2006/0109897 A1 * | 5/2006 | Guo ................... H04L 25/03044 375/232 |
| 2009/0147872 A1 | 6/2009 | Chong et al. |
| 2010/0124290 A1 * | 5/2010 | Kablotsky ............... H04L 27/36 375/259 |

FOREIGN PATENT DOCUMENTS

| WO | 2008130127 A1 | 10/2008 |
| WO | 2008130165 A1 | 10/2008 |

* cited by examiner

Primary Examiner — Jae Y Lee
Assistant Examiner — Jean F Voltaire
(74) Attorney, Agent, or Firm — Rothwell, Figg, Ernst & Manbeck, P.C.

(57) ABSTRACT

A method and apparatus is provided for performing initial ranging at a receiver for establishing a time reference for a predefined received signature signal (30) for establishing a time reference overcoming round trip time between a receiver and a transmitter. There is performed (316, 3161) matched filtering in at least two matched sub-filters (M1, M2, M3, M4), each sub-filter having a matched filter sub-sequence (43—1, 2; 3, 4; 5,6; 7,8) corresponding to a fragment (39) of the basic sequence (33) of the predefined signature signal (30), wherein the fragments do not overlap one another with respect to the basic sequence, the matched filtering by each respective sub-filter providing peaks in dependence of the respective sub-sequence (43) correlating with a respective fragment of the received signature signal.

18 Claims, 10 Drawing Sheets

METHOD AND APPARATUS FOR INITIAL RANGING FOR ESTABLISHING A TIME REFERENCE FOR A PREDEFINED SIGNATURE SIGNAL

CROSS REFERENCE TO RELATED APPLICATION(S)

This application is a 35 U.S.C. §371 National Phase Entry Application from PCT/EP2009/062808, filed Oct. 2, 2009, designating the United States, the disclosure of which is incorporated by reference herein in its entirety.

TECHNICAL FIELD

This invention is related to the problem of estimating propagation delays for signals transmitted in radio systems and wire-line systems where the distance between transmitter and receiver is unknown and may vary over time. More particularly, the invention relates to the invention may be applied to orthogonal frequency division multiplex access (OFDMA) systems but also other systems in which an estimation of timing properties is a condition for demodulation.

BACKGROUND

In for instance OFDMA systems, before the receiver can decode signals, the receiver needs to establish the given timing properties for the transmitter. The timing properties are dependent on the round trip timing between the transmitter and the receiver. For this purpose, the transmitter emits specific patterns or signatures, such as CDMA codes, to be used in a process step denoted initial ranging. IR, by the receiver. During the initial ranging, a sub-set of non-adjacent sub-carriers are transmitted in parallel with normal traffic on other sub-carriers. By performing initial ranging; parameters such as delay, frequency offset and channel quality for a mobile station can subsequently be established. When the base station has performed initial ranging, it instructs the mobile station to adjust uplink transmissions according to a desired timing regime.

A brief overview over OFDMA systems and especially sub-channel coding properties for multi-cellular use is given in prior art document "Orthogonal frequency division Multiple access: Is it the multiple access system of the future?", Srikanth S., Kumaran V., Manikandan AU-KBC Research center, Anna University, Chennai, India, downloaded from the internet on 2009-09-30.

In one OFDMA implementation, WiMAX, the OFDMA symbol timing is fixed at the base station and various timing advances are used to align all mobile stations. This means that the base station can send timing adjustment messages to the mobile station, so the mobile station signal is aligned with the base station timing. Time domain samples are transformed to frequency domain, based on the common OFDMA symbol timing.

Figure 1A:
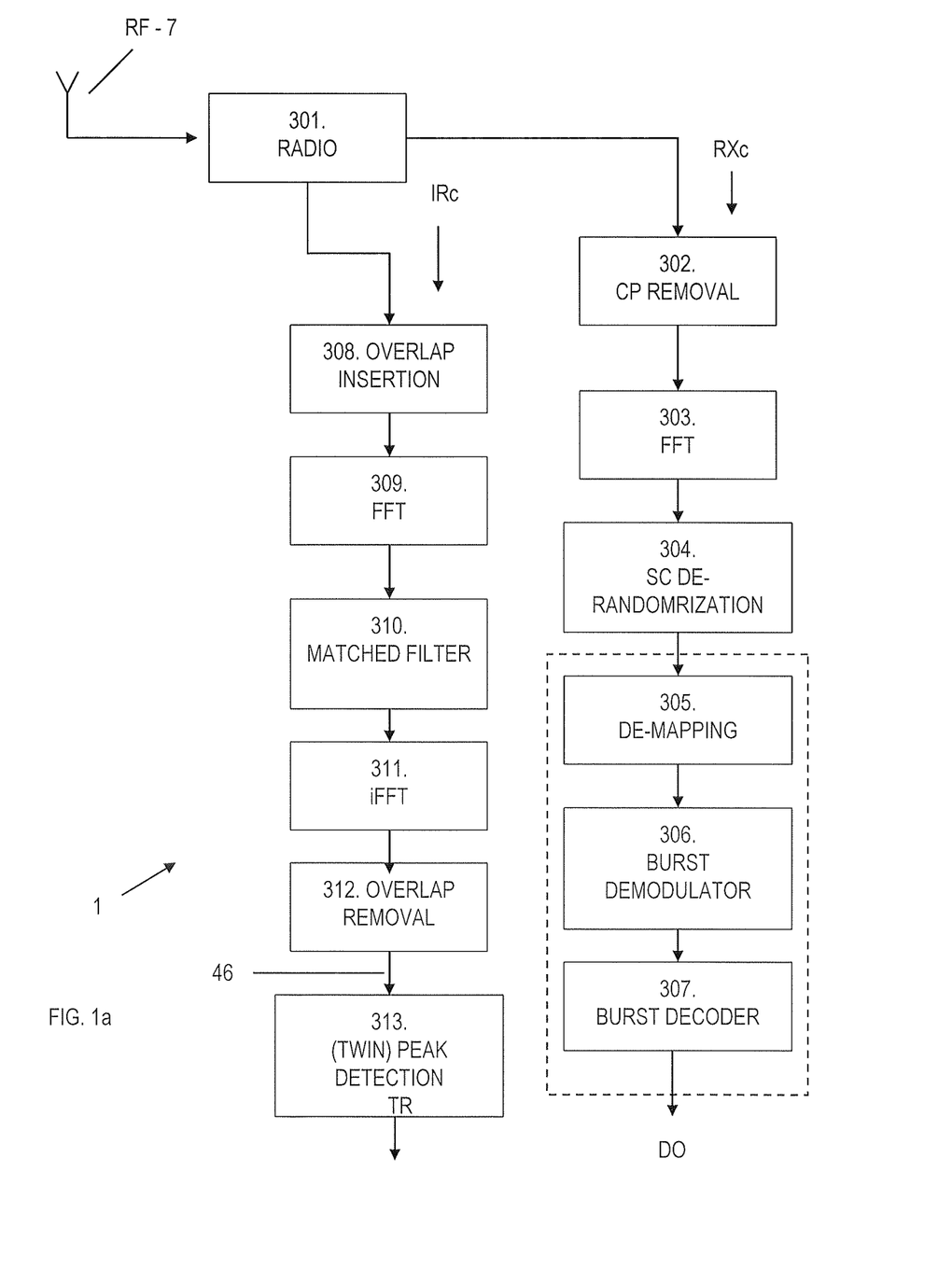
FIG. 1a shows a first receiver according to a reference design adapted for performing initial ranging (IR)

FIG. 1a shows a block-diagram of a WIMAX OFDMA base station receiver 1 according to an internal reference design of the applicant. A radio signal RF is processed in a radio front end unit, 301. The initial ranging patterns are detected by means of initial ranging chain IRc 308-313, for providing a time reference, TR. This is done separately from the receiver chain RXc, formed by stages 302-307, in which signals for time aligned users are processed for reception, such that respective digital output, DO, signals are generated.

The processing in the receiver chain RXc is possible when the time reference signal TR has been established/updated by the initial ranging chain IRc.

Stages 305-307 of the receiver chain RXc is provided for each user (stages for further users not shown) and the processing in these stages is subject to user specific parameters, whereas the processing in stages 308-313 and stages 303-304 is common for all users. The receiver chain comprises a cyclic prefix removal stage 302, a Fast Fourier transformation stage, 303, a SC (sub-carrier) de-randomization stage, 304, a de-mapping stage 305, a burst demodulator, 306, and a burst decoder, 307. The SC de-randomization stage, 304 reorders the sub-carriers that have been pseudo-randomly permutated in the receiver, dictated by the given standard under which the receiver is intended to work. The reordering is basically a frequency-hopping scheme that makes the transmission more robust to frequency selective fading or interference. The burst decoder provides the decoded digital output signal, DO. The initial ranging chain comprises an overlap insertion stage 308, a Fast Fourier stage 309, a matched filtering stage 310, an inverse Fast Fourier stage 311, an overlap removal stage 312, providing a detect signal 46 and a peak detection stage 313, providing the time reference signal TR.

The overlapping performed in stage 308 corresponds to a known method of doing correlation in the frequency domain, whereby the side effects of the cyclic convolution (inherent of the frequency domain method) are avoided.

Figure 3:
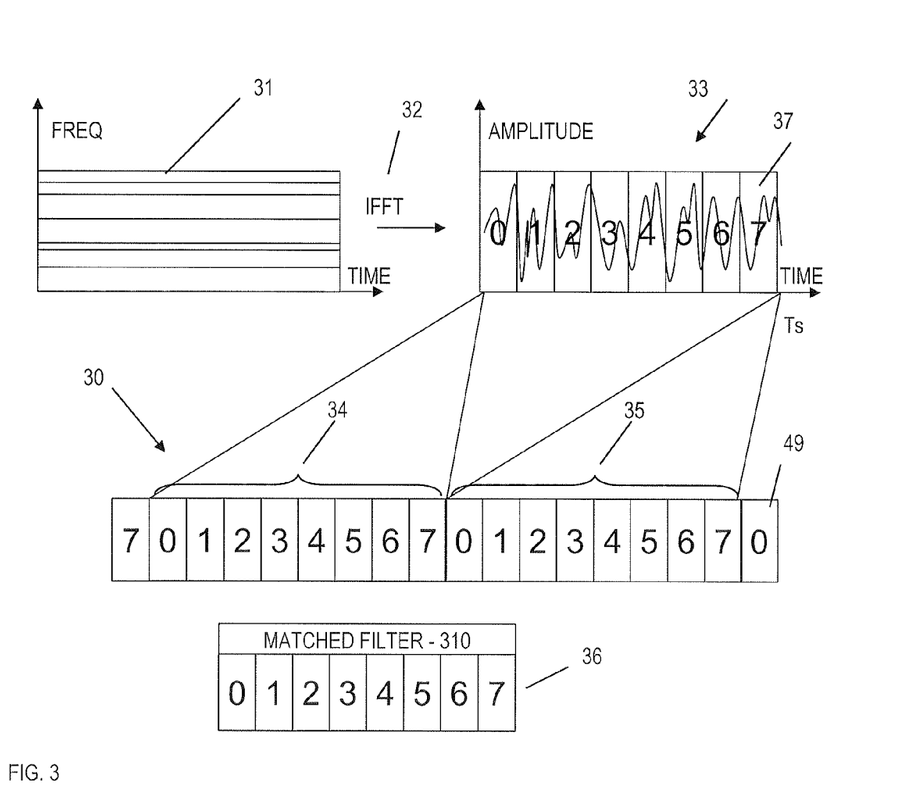
FIG. 3 shows process steps for accomplishing initial ranging for the receiver shown in FIG. 1.

FIG. 3 illustrates how the WIMAX OFDMA mode IR (Initial Ranging) signal is generated for subsequently being processed using the matched filter as represented by among others stage 310 in FIG. 1a. In this application, the initial ranging (IR) signal is also referred to as signature signal 30.

A sub-set of the available sub-carriers are allocated for IR during a given number of OFDMA symbols, i.e. a given period of time. Each mobile station not yet aligned with the base station may transmit signature signals using these sub-carriers and a specific time slot according to rules specified in the standard and according to parameters communicated by the base station in a periodic broadcasting message. The mobile station uses a CDMA code, selected from a finite set of CDMA codes, to modulate the IR sub-carriers 31, and then uses an iFFT 32 to calculate time domain samples 33. This time domain sample, also denoted basic sequence 33—can be split in shorter sequences, e.g. in 8 parts, 37. These parts are copied such that a resulting signature signal 30 appears which comprises for instance one copy of the basic sequence 34 and one repetition 35 of the basic sequence. Finally, padding parts 49 (in this case 7 and 0) are provided, thus forming the particular recognizable signature signal, 30. The padding parts are selected such that the padding parts and the parts of the sequence are cyclically repeated over the signature signal, e.g. 7 is arranged next to 0. It is noted that for general applications not having regard to the WiMAX OFDMA standard, other signature signals could be envisaged comprising more repetitions or no repetitions of the basic sequence 33. The mobile station transmits this signature signal 30 to call for the attention of the base station.

The signature signal 30 will arrive at the receiving base station delayed, because of the round-trip-time (RTT), which for mobile applications may be varying over time as the terminal may move. As mentioned above, it is crucial that the base station can estimate this delay (RTT) so it can send appropriate alignment messages to assure the RTT is compensated for and the transmissions from the mobile station can be aligned in time when arriving at the base station.

FIG. 3 shows further that the received signature signal 30 is filtered by matched filter 310 in the receiver shown in FIG. 1.

In this particular embodiment, the matched filter 310 is based on a filtering sequence 36 that is matched with the basic OFDMA symbol 33 that is used to build the full signature signal 30. The matched filter could be matched with a filtering sequence 36 corresponding to different sub-sequences 43 of the actual signature signal 30, a trade-off being made between the power of the peak and the number of mirror peaks.

Figure 3A:
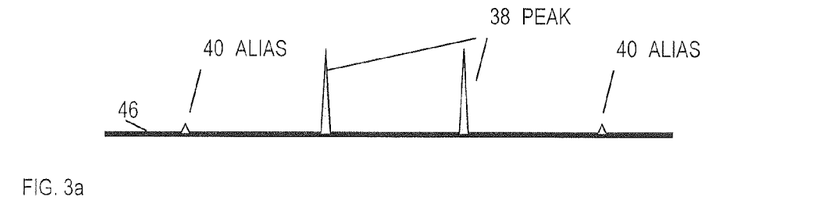
FIG. 3a shows the result of the IR chain of the FIG. 1a receiver.

FIG. 3a illustrates the response of the matched filter 310 when subject to the signature signal 30. From the position of the resulting peaks 38 provided at the output of the filter 310, the timing properties of the received IR signals can be resolved. Aliases (mirror peaks) 40 are also present in output but are discernable from the peaks 38 due to their smaller amplitude, and predictable positions It appears that the FIG. 1a solution requires redundant FFT means 303.

SUMMARY

It is a first object to set forth an improved method for performing initial ranging.

This object has been achieved by a method for performing initial ranging at a receiver for establishing a time reference for a predefined received signature signal 30 issued by a transmitter, the signature signal comprising a basic sequence 33, the method comprising the following steps receiving 301 an incoming signature signal 30, removing 302 one or more cyclic prefixes in the received signature signal, performing 303 fast Fourier transformation.

The method moreover concerns performing 316, 3161 matched filtering in at least two matched sub-filters M1, M2, M3, M4, each sub-filter having a matched filter sub-sequence 43—1, 2; 3, 4; 5,6; 7,8 corresponding to a fragment 39 of the basic sequence 33 of the predefined signature signal 30, wherein the fragments do not overlap one another with respect to the basic sequence, the matched filtering by each respective sub-filter providing peaks in dependence of the respective sub-sequence correlating with a respective fragment of the received signature signal, performing inverse fast Fourier transformation 3162;

performing alias discarding 3163;

aligning 3164—D1, D2; D3 the outputs of the at least two sub-filters, such that the provided peaks are aligned in time.

Finally, the following steps are carried out:

summing 3165 the outputs 312—A1; A2, A3 of the sub-filters, performing peak detection 317 on the summed output, detecting one or more peaks, if the amplitude of the detected peak and/or peaks 47 meets a predefined threshold deeming that the incoming signature signal corresponds to the predefined signal and establishing a time reference TR from position of the detected peak and/or peaks.

It is a second object of the invention to set forth an apparatus for performing initial ranging which is realized at a reduced hardware cost.

This object has been accomplished by an apparatus for performing initial ranging in a receiver for establishing a time reference for a predefined received signature signal 30 issued by a transmitter, the signature signal comprising a basic sequence 33, the apparatus comprising a front end unit 301 in which an incoming signature signal 30 can be received, a cyclic prefix removal stage 302 for removing one or more cyclic prefixes in the received signature signal, a fast Fourier transformation stage 303, The apparatus moreover comprises a matched sub filtering block 316, 3161 for performing matched filtering in at least two matched sub-filters M1, M2, M3, M4, each sub-filter having a matched filter sub-sequence 43—1, 2; 3, 4; 5,6; 7,8 corresponding to a fragment 39 of the basic sequence 33 of the predefined signature signal 30, wherein the fragments do not overlap one another with respect to the basic sequence, the matched filtering by each respective sub-filter providing peaks in dependence of the respective sub-sequence correlating with a respective fragment of the received signature signal, an inverse fast Fourier transformation stage 3162;

an alias discarding stage 3163;

an alignment stage 3164—D1, D2; D3 for aligning the outputs of the at least two sub-filters, such that the provided peaks are aligned in time.

There is also provided a summing stage 3165 for summing the outputs 312—A1; A2, A3 of the sub-filters, a peak detection stage for performing peak detection 317 on the summed output, detecting one or more peaks, and a peak detection stage 317 for detecting if the amplitude of the detected peak and/or peaks 47 meets a predefined threshold deeming that the incoming signature signal corresponds to the predefined signal and establishing a time reference TR from position of the detected peak and/or peaks.

One advantage provided by certain further aspects of the present invention is that IR signatures can be detected, using the same FFT calculations, as for 'normal traffic', that is traffic processed in a reception chain of a receiver. This allows a straight forward architecture where FFTs may be calculated in a front-end accelerator.

Further advantages of the invention will appear from the following detailed description of the invention.

DETAILED DESCRIPTION

Figure 1B:
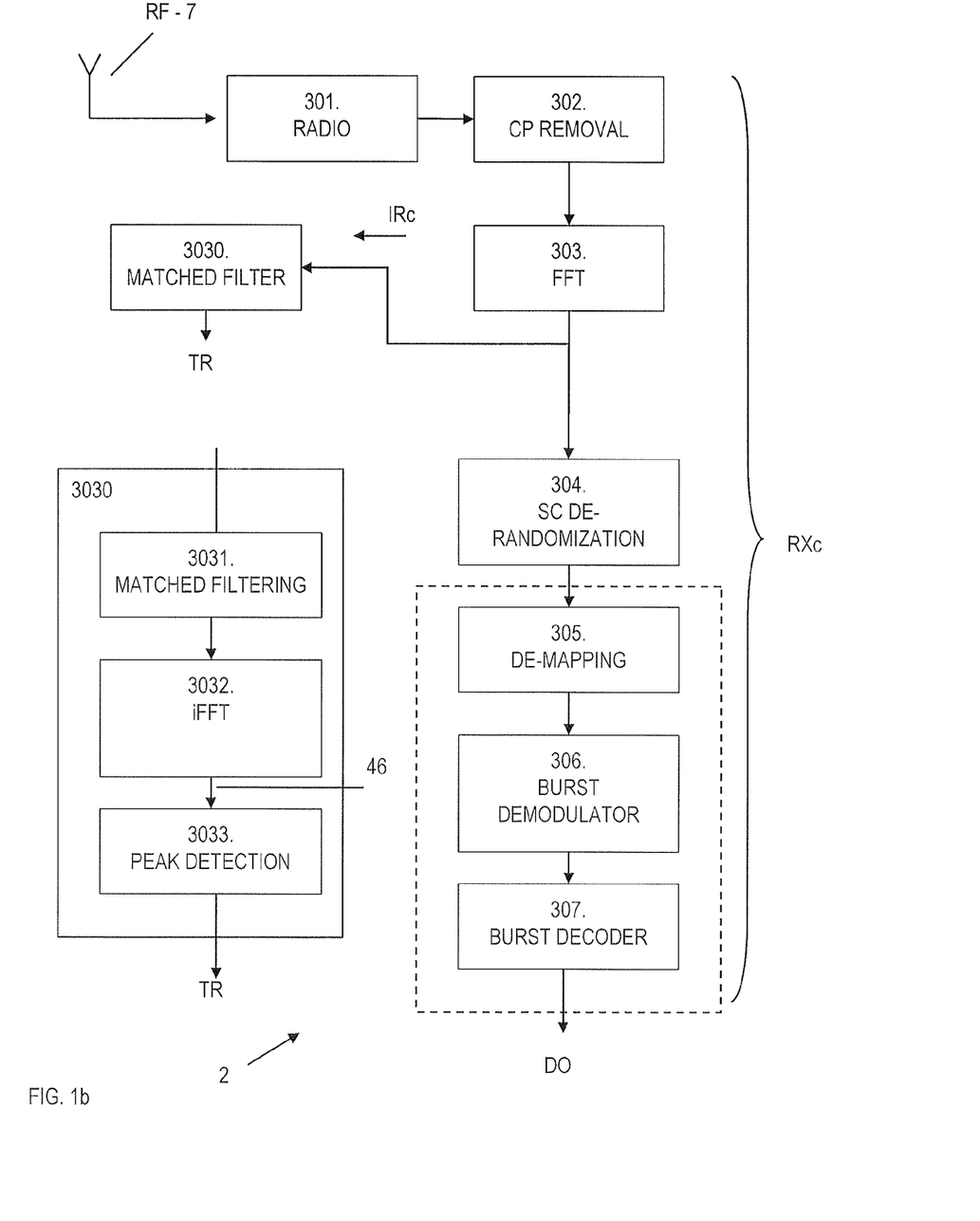
FIG. 1b shows a second receiver according to a reference design adapted for performing initial ranging.

FIG. 1b shows a reference design of a second receiver 2 according to an internal nonpublic by the applicant adapted for performing initial ranging, which receiver comprises a matched filter 3030, which is adapted for providing both initial ranging and signal demodulation. The matched filter comprises filtering stage 3031, iFFT stage 3032, providing detect signal 46, and peak detection means 3033.

Figure 3B:
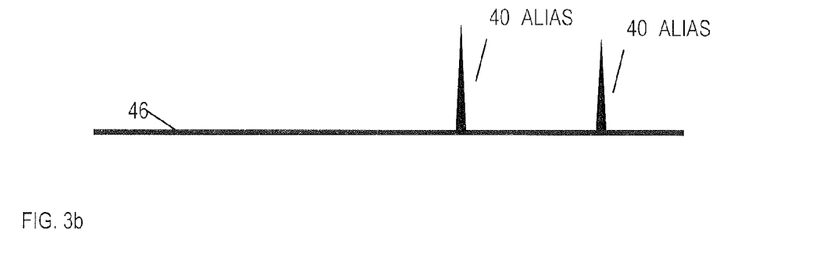
FIG. 3b shows the result of the IR chain of the FIG. 1b receiver.
Figure 3C:
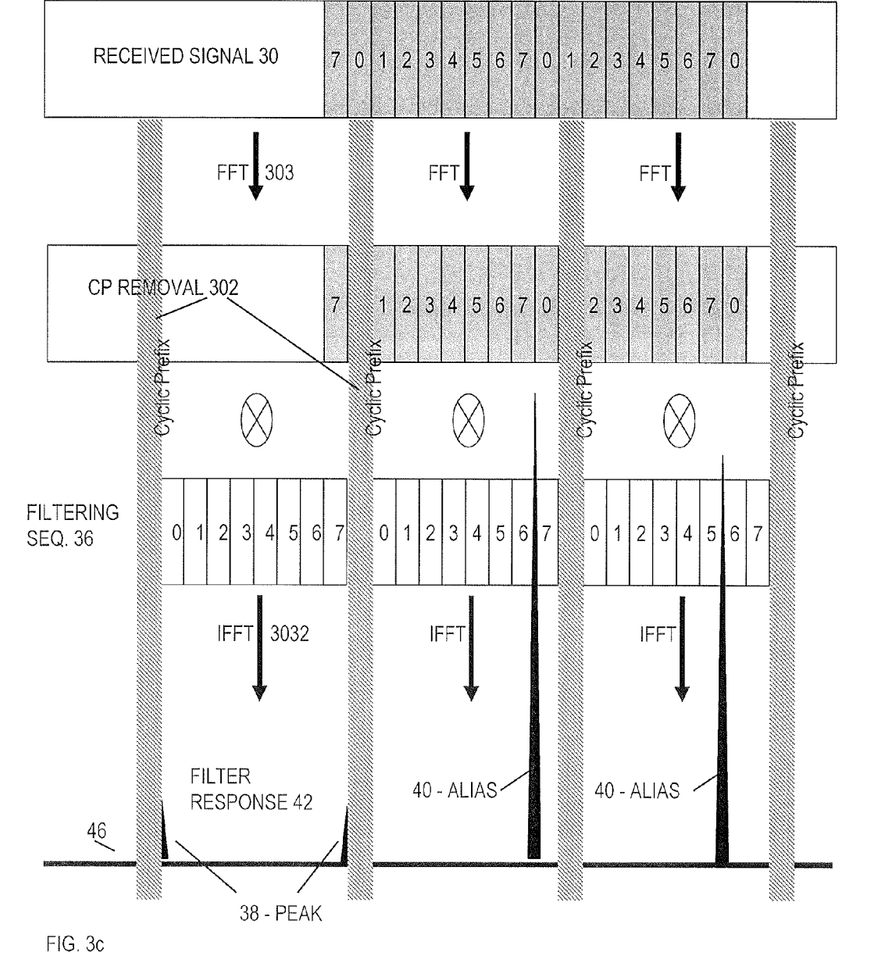
FIG. 3c shows process steps for accomplishing initial ranging for the receiver shown in FIG. 1b.

FIGS. 3b and 3c illustrate the result, using the receiver according to FIG. 1b when correlating the received signature signal 30 with the IR basic sequence in the frequency domain. It appears that for the receiver of the internal reference design of FIG. 1b, unwanted aliases 40 may appear which have considerable amplitude. This is because of the fundamental properties of the frequency domain correlation; which in time domain corresponds to a cyclic convolution. During each FFT window, the correlation response is actually a single repetition of a periodic correlation result. The two sequences that are correlated are also per definition single sequences of a periodic signal. This is fundamental properties of the frequency domain correlation, which thus only applies to finite intervals, i.e. single repetitions of infinite periodic signals. The consequence is that, if the pattern of interest is not completely inside the interval in which it is to be found, the response will appear as a cyclic repetition, aka an alias. From FIGS. 3a and 3b, a comparison of the ideal filter and frequency domain filter responses is illustrated. In FIG. 3a the correlation response is shown for a time domain correlation (non-cyclic convolution), i.e. a regular FIR filter operation. In FIG. 3b the concatenated response of multiple frequency domain correlations (cyclic convolutions) is shown. Note that the latter gives a false indication of the IR signal alignment. Since the response in each individual response is cyclically repeated due to the fact that the pattern is not completely inside the interval.

FIG. 3c shows the signature signal being processed by initial ranging stage 308-313 of the receiver shown in FIG. 1b. The received signature signal 30 is processed by cyclic prefix removal 302 And FFT 303. Subsequently, a correlation in the frequency domain is performed in matched filter 3031, whereby a pair-wise multiplication of the received processed signals and frequency domain samples of the filtering sequence 36 are performed. An iFFT is performed in stage 3032 for providing the filter response, 42. As appears from the figure, the filtering corresponds to a correlation of the received signal with various copies of the filtering sequence 36 each of which are gradually skewed in time. Thereby minor peaks 38 and aliases 40 may appear depending on the correlation result.

The reference time signal TR is derived by peak detection stage 3033 which hence may provide erroneous results.

PREFERRED EMBODIMENTS OF THE INVENTION

Figure 2:
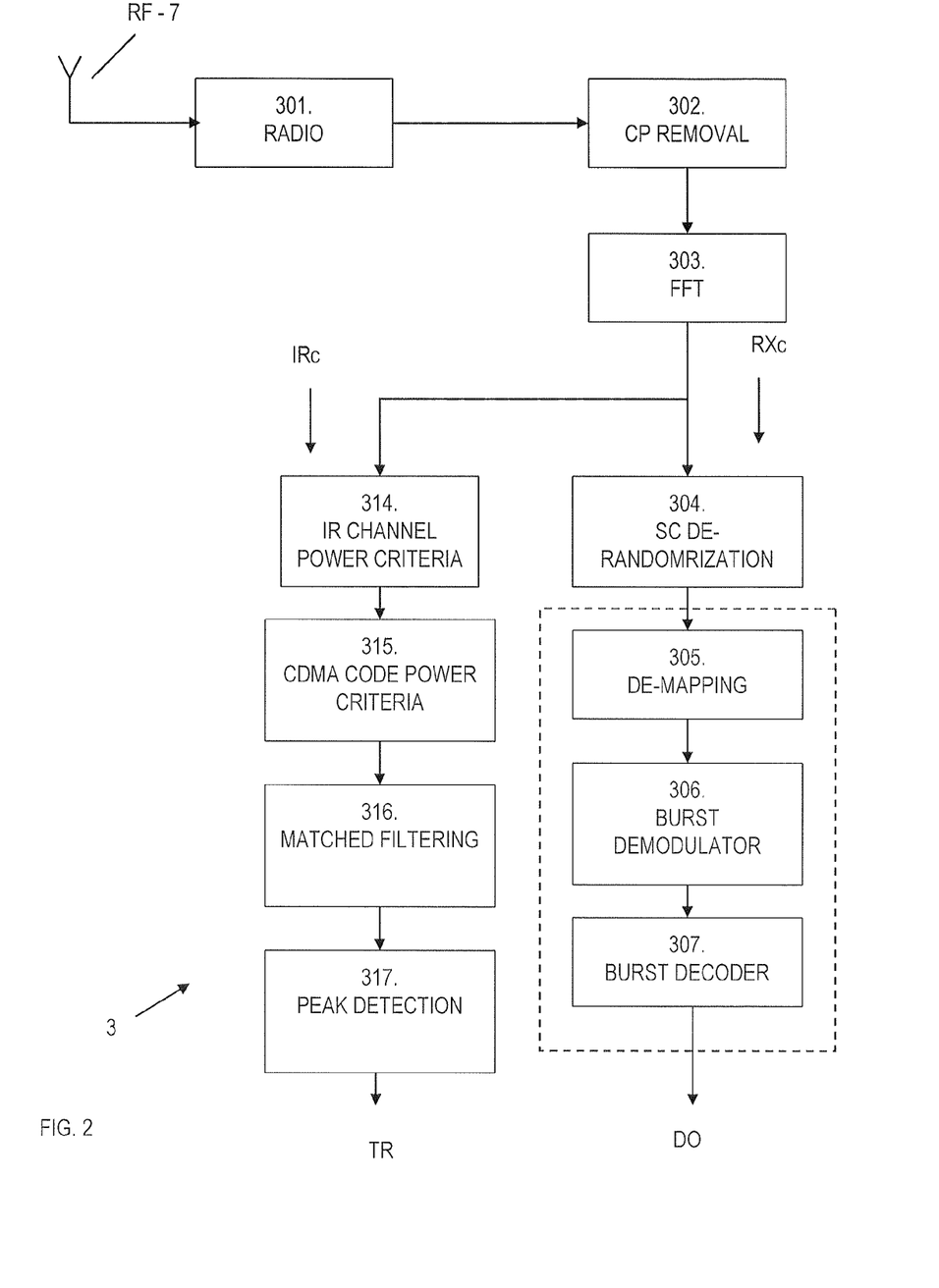
FIG. 2 shows a first embodiment of a receiver according to the invention adapted for performing initial ranging.
Figure 2A:
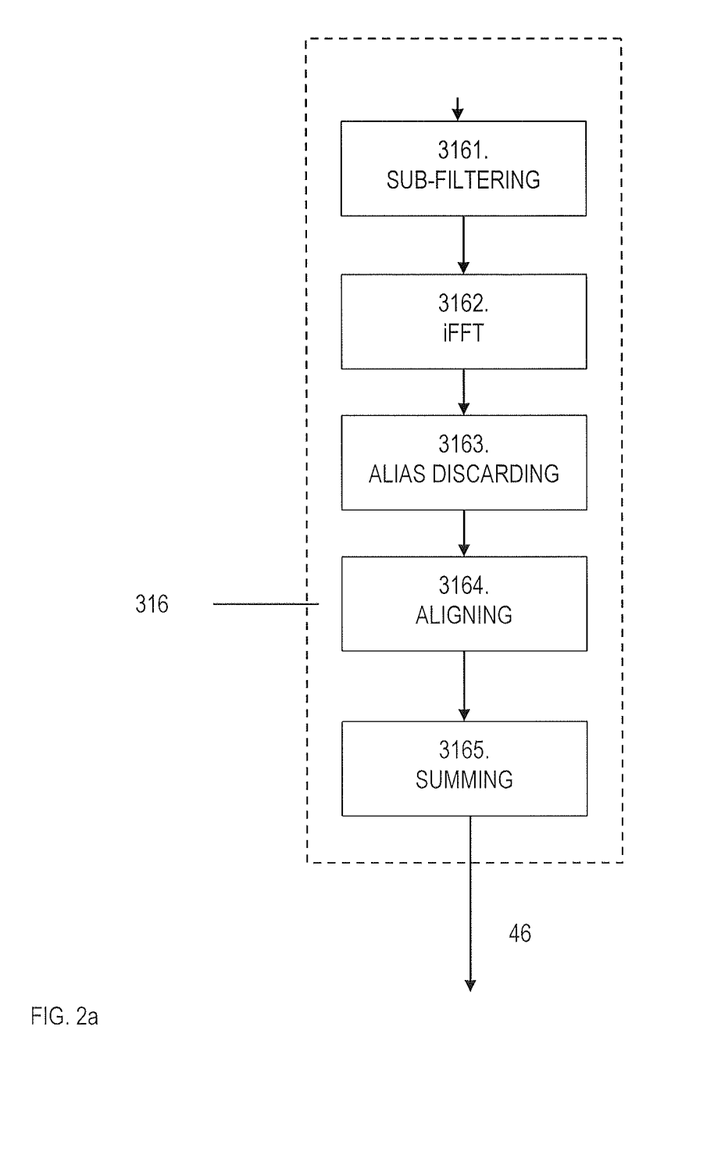
FIG. 2a shows a detail of FIG. 2.

In FIG. 2, a first embodiment of a receiver 3 according to the invention is shown. Stages with the same function as in the reference design shown in FIGS. 1a and 1b have been given same reference numerals. A common part of the regular receiver chain and the initial ranging chain, represented by stages 301-303 is provided. An IR detection chain IRc is provided by stages 314-317 while a receiving chain RXc is represented by stages 304-307.

In the first two blocks in the IR chain IRc, an optional IR channel power criteria detection stage 314 and a CDMA code power criteria 315 detection stage are provided. In IR channel power criteria stage 314, it is detected whether there is a sufficient power level in the IR sub-carriers. If such sufficient power level is detected, it is deemed worthwhile to perform a further detection. This is accomplished by CDMA code power criteria stage 315, where it is detected if there is sufficient power specifically for each IR CDMA code. If the latter is also the case, it is deemed worthwhile to estimate the alignment/delay of the IR signature signal. In the matched sub filtering block 316, which constitutes the core element of the invention, the alignment/delay of a specific IR signature signal 30, in the received signal, is estimated. The signal is made subject to sub-filtering in stage 3161, and is then processed in iFFT stage 3162. Subsequently, alias discarding is performed in 3163 and aligning is performed in stage 3164. After alignment, summing is performed in summing stage 3165, providing detect signal 46. Eventually, the peak detection stage 317 makes a decision by finding two peaks at a given constant distance. Finally, a timing reference TR is found from the location of the peak(s).

According to the first embodiment of the invention, the matched sub filtering block 3161 correlates the received signal 30 with a plurality of filtering sub sequences (43—1, 2; 3, 4; 5, 6) by using sub filters M1, M2, M3 and M4. The processing is based on re-using the signal provided by FFT 303 of the common part of the regular receiver chain RXc and the initial ranging chain IRc. Among others, the processing performed by the invention eliminates the aliasing effect, that is, it eliminates alignment ambiguities inherent in the frequency domain correlation.

Figure 5:
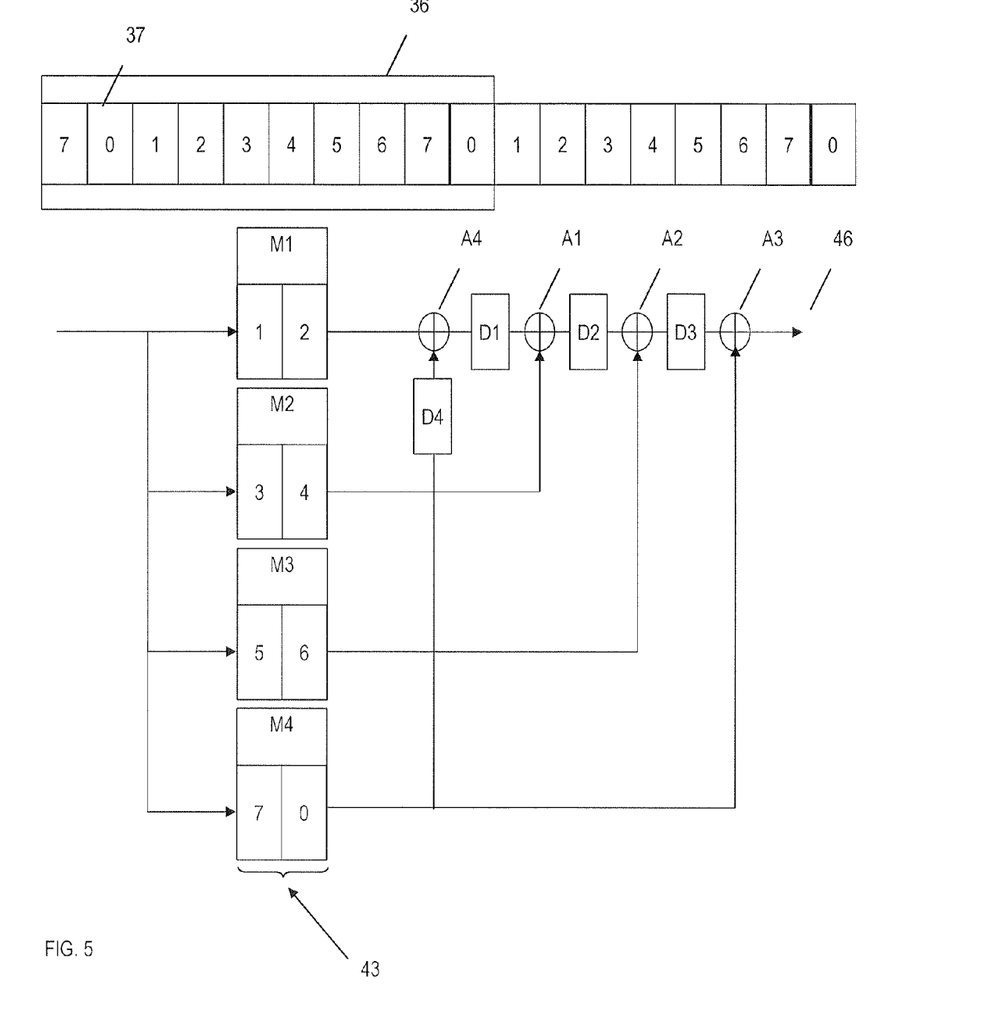
FIG. 5 shows filter details for a second embodiment of the invention.

In FIG. 5, an embodiment of the mechanism provided by the matched sub filtering stage 316 is shown in more detail. According to FIG. 5 (and later shown in FIG. 5a), in each FFT window, the alias problem is confined to the end of the FFT window. The size of this zone is the same as the length of the pattern 42 with which the received signature signal 30 is correlated. The frequency domain correlation is done in finite interval (regarded as a period of a periodic signal). The infinite time domain signal is thus divided into finite intervals. These intervals can also be denoted "FFT windows". To minimize the "alias zone", the FFT window 43 (used in each matched sub-filter M1-M3) is minimized, in this example, to two samples.

Filtering in stage 3161 is performed by means of a bank of matched sub-filters M1-M3 each sub-filter having a matched filter sub-sequence (43—1,2; 3,4; 5,6; 7,0), corresponding to a fragment 39 of a basic sequence 33 of the predefined signature signal 30, each fragment being shorter than the basic sequence, 33, of the signature signal, wherein the fragments pertaining to the matched sub-filters M1-M3 are different from one another and wherein all fragments cover at least a portion of the basic sequence 33.

FIG. 5 moreover shows the aligning corresponding to alignment stage 3165 and which is more detailed illustrated by delay means D1, D2, D3 and D4. The summing stage 3165 performs summing by means of summing means A4, A1, A2 and A3. It should be noted that the alias discarding 3163 and iFFT 3162 is not shown in FIG. 5.

Although the invention is about correlation in the frequency domain, it is easier to describe the invention in the time domain. By splitting the filter operations into multiple operations, each using a (shorter) sub-sequence additional complexity is introduced, but it makes it possible to use frequency domain methods, which are more efficient in terms of processing requirements.

It is noted that the CP removal stage 302 and the fast Fourier transformation stage 303 forms a front end accelerator which is shared by—or forms part of both—the receive chain RXc and the initial ranging chain, IRc.

Figure 4:
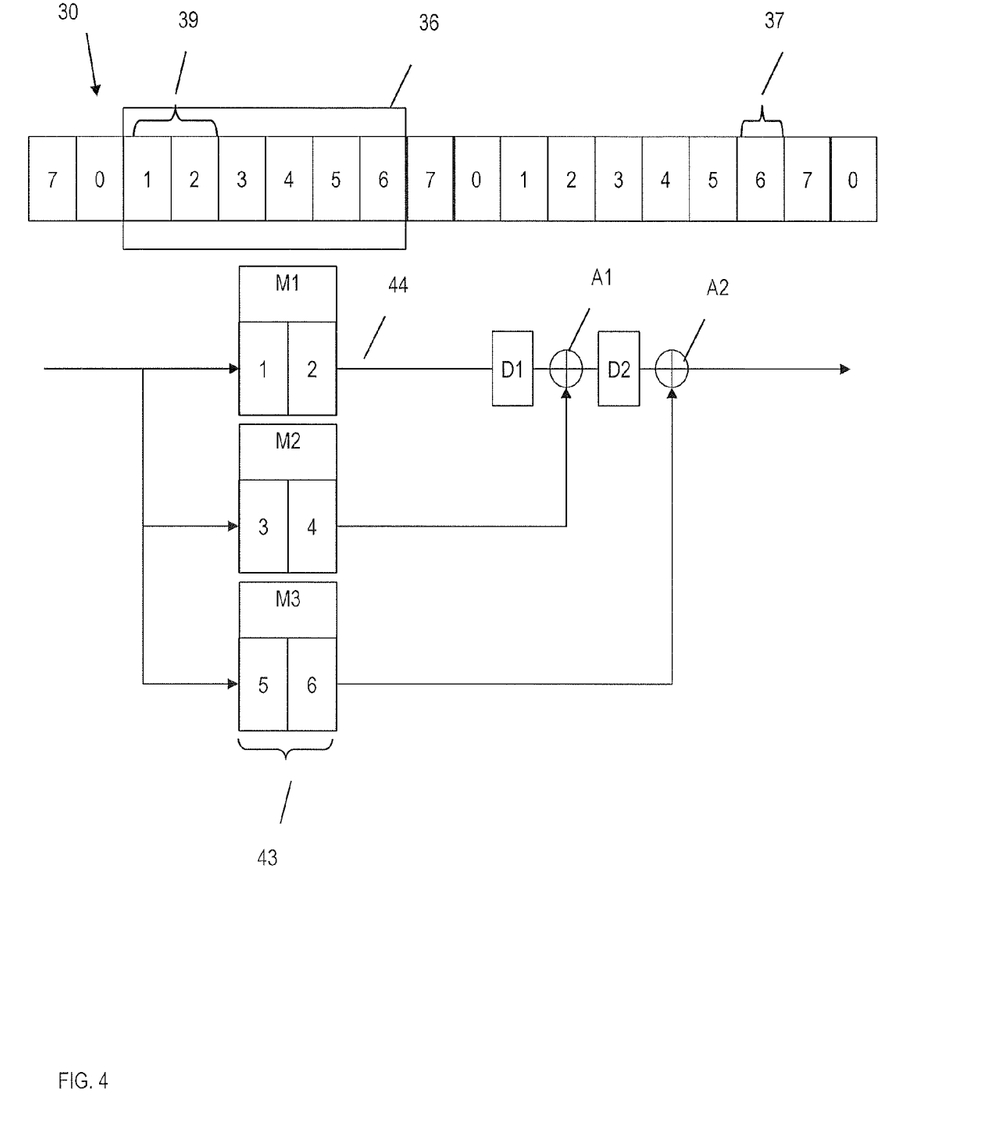
FIG. 4 shows filter details for a first embodiment of the invention.

FIG. 4 shows another exemplary embodiment according to the invention, wherein a bank of multiple sub-filters M1-M3 are matched to only certain predefined parts of the basic sequence 33. It is noted that samples corresponding to 7 and 0 are not found in any of the filtering sub-sequences. Despite of this, an ample timing reference can be provided.

Figure 5A:
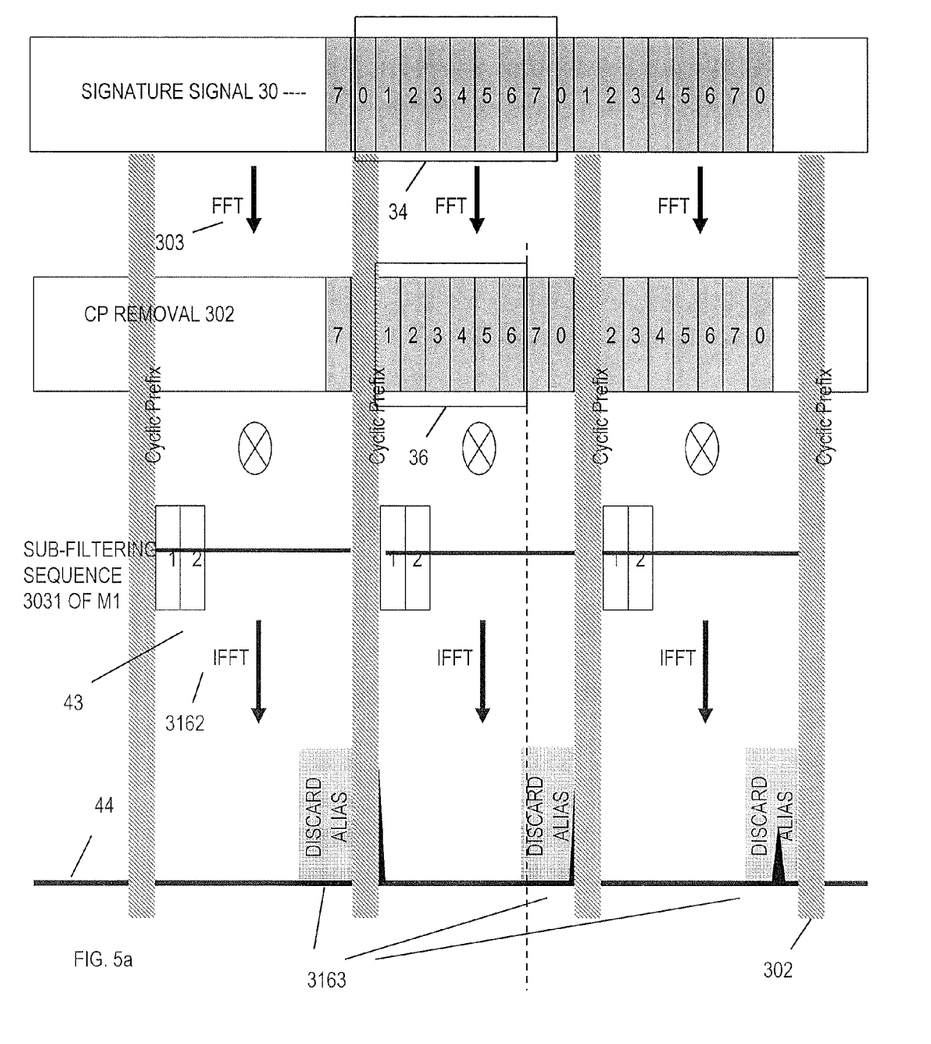
FIG. 5a shows the filtering process for the sub-filter M1 of FIG. 4.

In FIG. 5a, the workings of the FIG. 5 sub-filtering and the signal processing in the IR chain IRc of FIG. 1b is shown in more detail. Here, the response 44 and the alias elimination 3162 of the filter matched to parts 1 and 2 of the IR signal is shown (the parts 3—, 0 not being shown, although these are also treated in analogue fashion). The signature signal 30 is processed in FFT 303 and made subject to cyclic removal 302. Subsequently, the signal is filtered by sub filtering sequence 43 for sub-filter M1. (M2-M4 also processing—but not shown). Then the signal is made subject to an inverse FFT in iFFT 3162 and discarding of aliases at predefined positions by alias discarding stage 3163. The predefined positions are defined by how the frequency domain filter coefficients are chosen, and may be chosen as is known in the art. The response 44 for sub-filter M1 is shown.

Figures 6, 7:
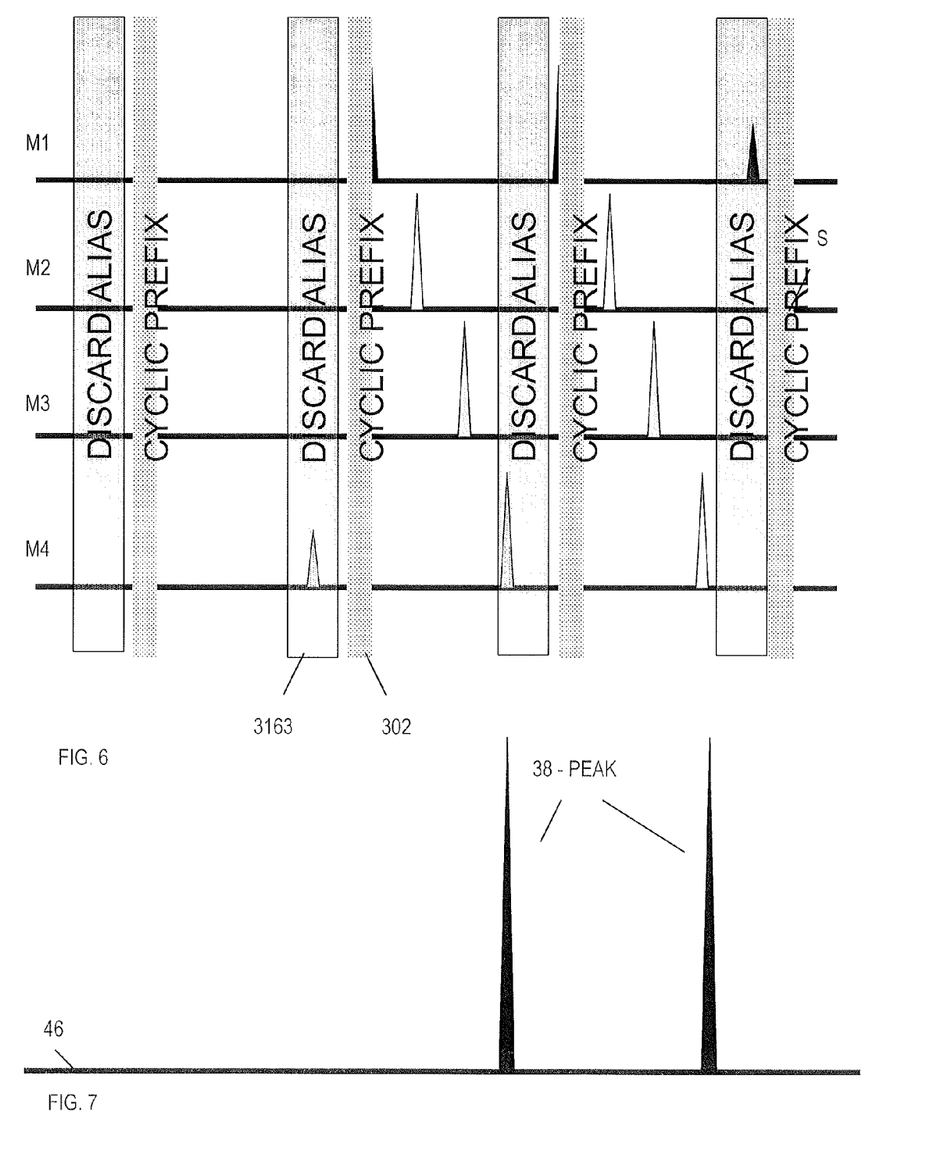
FIG. 6 shows the filtering processes for all sub-filters M1-M4, relating to the FIG. 5 embodiment.
FIG. 7 shows a summed output response of the FIG. 5 embodiment.

In FIG. 6, the response of all the sub-filters M1-M4, before delaying, of the FIG. 5 embodiment is shown.

In FIG. 7 the final output 46, which appears after appropriate delaying in delay stages D1-D4 and the adding units A1-A4 have aligned the signals. Two peaks 47 appear in the response, which is substantially free from aliases. It is noted that delaying could be applied in each branch, before summing, but the cascaded delaying shown in FIG. 5 constitutes are more economical solution since summing stages are less hardware intensive than delaying stages.

In conclusion, a robust signature detector has been provided, which uses the symbol aligned FFT window.

The detector provides negligible false alarms and near perfect detection ratio at SNRs above 0 dB. The detection is significant down to −10 dB. The quality of autocorrelation properties vary significantly depending on selected CDMA code AND allocated IR channel. Restricting certain combinations in the system will increase IR performance significantly.

The invention claimed is:

1. A method for performing initial ranging at a receiver for establishing a time reference for a predefined received signature signal issued by a transmitter, the signature signal comprising a basic sequence, the method comprising the following steps:
   receiving an incoming signature signal;
   removing one or more cyclic prefixes in the received signature signal;
   performing fast Fourier transformation on the received signature signal after the one or more cyclic prefixes are removed;
   performing, on the output of the fast Fourier transformation, matched filtering in at least two matched sub-filters, each matched sub-filter having a matched filter sub-sequence corresponding to a fragment of the basic sequence of the predefined signature signal, wherein the sub-sequences of the matched sub-filters correspond to the complete basic sequence, wherein the fragments do not overlap one another with respect to the basic sequence, the matched filtering by each respective sub-filter providing peaks in dependence of the respective sub-sequence correlating with a respective fragment of the received signature signal;
   performing an inverse fast Fourier transformation on the output of the matched filtering;
   performing alias discarding on the output of the inverse fast Fourier transformation;
   aligning, after the alias discarding is performed, the outputs of the at least two sub-filters, such that the provided peaks are aligned in time;
   summing the outputs of the sub-filters;
   performing peak detection on the summed output, detecting one or more peaks;
   determining that the detected peak and/or peaks meets a predefined threshold; and
   as a result of determining that the detected peak and/or peaks meets the predefined threshold; deeming that the incoming signature signal corresponds to the predefined signal and establishing a time reference from position of the detected peak and/or peaks.

2. The method according to claim 1, wherein the matched filters have the same symbol length and operate in parallel on the received signal.

3. The method according to claim 1, wherein the sum of all sub-sequences corresponds to at least a portion of the basic sequence.

4. The method according to claim 1, wherein the basic sequence is repeated in the signature signal one or more times.

5. The method according to claim 1, wherein the sub-sequences have the same length.

6. The method according to claim 1, wherein the filtering of the sub-filters is performed in the frequency domain.

7. The method according to claim 1, wherein the filtering of the sub-filters is performed in the time domain.

8. An apparatus for performing initial ranging in a receiver for establishing a time reference for a predefined received signature signal issued by a transmitter, the signature signal comprising a basic sequence, the apparatus comprising:
   a front end unit in which an incoming signature signal can be received;
   a cyclic prefix removal stage for removing one or more cyclic prefixes in the received signature signal;
   a fast Fourier transformation stage configured to perform a fast Fourier transformation on the received signature signal after the one or more cyclic prefixes are removed;
   a matched sub filtering block for performing, on the output of the fast Fourier transformation stage, matched filtering in at least two matched sub-filters, each matched sub-filter having a matched filter sub-sequence corresponding to a fragment of the basic sequence of the predefined signature signal, wherein the sub-sequences of the matched sub-filters correspond to the complete basic sequence, wherein the fragments do not overlap one another with respect to the basic sequence, the matched filtering by each respective sub-filter providing peaks in dependence of the respective sub-sequence correlating with a respective fragment of the received signature signal;
   an inverse fast Fourier transformation stage configured to perform an inverse fast Fourier transformation on the output of the matched filtering;
   an alias discarding stage configured to perform alias discarding on the output of the inverse fast Fourier transformation stage;
   an alignment stage for aligning, after the alias discarding is perforated, the outputs of the at least two sub-filters, such that the provided peaks are aligned in time;

a summing stage for summing, after the aligning is performed, the outputs of the sub-filters;

a peak detection stage for performing peak detection on the summed output, detecting one or more peaks; and a peak detection stage for detecting if the amplitude of the detected peak and/or peaks meets a predefined threshold deeming that the incoming signature signal corresponds to the predefined signal and establishing a time reference from position of the detected peak and/or peaks.

9. The apparatus according to claim 8, wherein the matched filters have the same symbol length and operate in parallel on the received signal.

10. The apparatus according to claim 8, wherein the sum of all sub-sequences corresponds to at least a portion of the basic sequence, and where a portion of the basic sequence is not covered by any sub-sequence.

11. The apparatus according to claim 8, wherein the sub-sequences of the sub-filters correspond to the complete basic sequence.

12. The apparatus according to claim 8, wherein the basic sequence is repeated in the signature signal one or more times.

13. The apparatus according to claim 8, wherein the apparatus forms part of an initial ranging chain and wherein the cyclic prefix removal stage and the Fast Fourier transform stage is forming part of a receive chain and the initial ranging chain.

14. The apparatus according to claim 13, wherein the receiving chain moreover comprises a sub-carrier de-randomization stage, a de-mapping stage, a burst demodulator and a burst decoder providing a digital output, said sub-carrier de-randomization stage, de-mapping stage, burst demodulator and a burst decoder, being adapted for processing a signal from the fast frequency transform stage.

15. The apparatus according to claim 14, wherein the receiver is adapted to operate on orthogonal frequency division multiplex access signals.

16. The method according to claim 1, wherein each fragment is different from one another and all fragments cover at least a portion of the basic sequence.

17. The method according to claim 1, wherein each sub-sequence is gradually skewed in time.

18. The method according to claim 1, wherein the fast Fourier transformation is performed with a window size configured such that an alias is positioned as the end of the window.

\* \* \* \* \*